US008819615B2

(12) United States Patent
Le Coz et al.

(10) Patent No.: US 8,819,615 B2
(45) Date of Patent: Aug. 26, 2014

(54) ELECTRONIC CIRCUIT DESIGN METHOD

(71) Applicant: STMicroelectronics SA, Montrouge (FR)

(72) Inventors: Julien Le Coz, Grenoble (FR); Sylvain Engels, Meylan (FR); Alain Tournier, Crolles (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 14/028,188

(22) Filed: Sep. 16, 2013

(65) Prior Publication Data

US 2014/0089885 A1 Mar. 27, 2014

(30) Foreign Application Priority Data

Sep. 21, 2012 (FR) ..................................... 12 58909

(51) Int. Cl.
  *G06F 11/22* (2006.01)
  *G06F 17/50* (2006.01)
(52) U.S. Cl.
  CPC .......... *G06F 17/5077* (2013.01); *G06F 17/505* (2013.01); *G06F 2217/84* (2013.01)
  USPC ........... 716/136; 716/112; 716/113; 716/128; 716/132; 716/134
(58) Field of Classification Search
  CPC . G06F 17/5031; G06F 1/3203; G06F 1/3296; G06F 2217/78; G06F 11/261; G06F 11/263
  USPC .......... 716/108, 112, 113, 128, 132, 134, 136
  See application file for complete search history.

(56) References Cited

U.S. PATENT DOCUMENTS 6,313,622 B1 * 11/2001 Seki et al. .................. 324/76.82
2005/0218871 A1   10/2005 Kang
2009/0150847 A1 *  6/2009 Morgenshtein et al. ........ 716/11

OTHER PUBLICATIONS

Wang, Xiaoxiao, et al: "A Novel Architecture for On-Chip Path Delay Measurement," Paper 12.1, International Test Conference, 2009, IEEE (10 pages).
Wang, Xiaoxian, et al: "Path-RO: A Novel On-Chip Critical Path Delay Measurement Under Process Variations," sponsored in part by Semiconductor Research Corporation under contracts of Nos. 1455 and 1587, date unknown (7 pages).
INPI Search Report for FR 1258909 dated Jun. 14, 2013 (9 pages).
Ikenaga, Yoshifumi, et al: "A 27% Active-Power-Reduced 40-nm CMOS Multimedia SoC With Adaptive Voltage Scaling Using Distributed Universal Delay Lines," 2012 IEEE (9 pages).

* cited by examiner

*Primary Examiner* — Nha Nguyen
(74) *Attorney, Agent, or Firm* — Gardere Wynne Sewell LLP

(57) ABSTRACT

A first assembly of critical cells is to be monitored. An equivalent capacitance of output cells coupled to the critical path is determined. Logic level inputs of the critical cells for signal propagation are also determined. A second assembly of control logic cells is provided which copies the first assembly in terms of number of cells, type of cells and cell connection such that each of the control cells is a homolog of a corresponding critical cell. Charge cells are provided at the outputs of the control cells having an equivalent capacitance in accordance with the determined capacitance of the output cells. For each control cell, logic levels are asserted in accordance with the determined configuration of the critical path. A signal generator applies a signal the input of the second assembly and a signal receiver is coupled to the output of the second assembly.

20 Claims, 5 Drawing Sheets

ELECTRONIC CIRCUIT DESIGN METHOD

PRIORITY CLAIM

This application claims priority from French Application for Patent No. 1258909 filed Sep. 21, 2012, the disclosure of which is incorporated by reference.

TECHNICAL FIELD

The present disclosure relates to the design of electronic circuits especially integrating means for controlling its operation.

BACKGROUND

An integrated circuit generally comprises multiple logic components such as logic gates, interconnected to form logic paths for performing various operations, such as calculation, etc. A logic path especially connects an input to an output and crosses a number of logic gates.

Some of these logic paths may potentially be considered as critical paths, especially when the times of propagation through these paths are the highest. Such critical paths determine the circuit performance and especially set the extreme conditions for the circuit to operate properly. For example, the logic path for which the propagation or processing time is the highest sets the maximum operating frequency of the circuit. Further, a path can be considered as critical when it is particularly sensitive to the value of the power supply voltage for the proper operation of the circuit portion relative thereto, or when it is particularly sensitive to a temperature variation or to an abrupt voltage variation.

It is thus important to be able to determine the critical paths from among the logic paths of the circuit. Different tools enabling to determine such critical paths exist and are thus not detailed hereafter.

It is further also important to be able to monitor the logic paths considered as critical, to predict a possible failure of the circuit in specific operating conditions. To achieve this, it is known to implement a replica of each of the paths to be monitored. This replica path especially is a sub-optimal reproduction of the path to be monitored. More specifically, this replica path is a circuit which especially applies the same logic function to an input signal as the path to be monitored, but differs from the path to be monitored in a few parameters such as, for example, the propagation delay or the threshold voltage, so that the failure of the replica path occurs before that of the path to be monitored. Another solution comprises introducing, at the end of the critical path, a detection flip-flop anticipating the arrival of the signal on the output flip-flop. This intrusive solution, called "canary detection", increases the delay of the critical path, and is thus banned.

SUMMARY

In this context, a new solution is disclosed hereafter to obtain a control circuit which is a replica of a logic path of a functional circuit.

The provided solution especially has the advantage of being less complex and of enabling to replicate the critical path without requiring modifying the structure of the main circuit. Further, the obtained control circuit is controlled separately from the main circuit.

The control circuit is structurally independent from the logic portions containing the logic paths to be replicated and may be locally placed at the same location or elsewhere, which enables it to be or not submitted to the same constraints (voltage drops, temperature increase, manufacturing process variation). Further, the control circuit may be activated whatever the operating modes of the critical paths.

This control circuit thus is an identical reproduction of the critical paths (same cells, same distance between cells, same logic depth, same fan-out), which enables it to be considered as a clone-type replica.

For this purpose, according to an aspect, a method for designing an electronic circuit comprises the steps of: A/ identifying a first assembly of critical logic cells of a main circuit, the critical cells being series-connected according to a path "to be monitored" between an input node and an output node of the main circuit; B/ identifying all the output logic cells, other than those crossed by this path, which are directly connected to the output of each of these critical cells; C/ determining the equivalent capacitance of each identified output cell, for the considered path; D/ for each critical cell, determining a logic level for each input which is not connected to another critical cell of the considered path, all the logic levels thus determined being capable of forcing a signal present at the input node to follow the considered path; E/ implanting a control circuit formed of a second assembly of control logic cells, this second assembly being different from the first assembly and being the exact copy of the first assembly in terms of number and of type of cells, and in terms of connection diagram, each of the control cells being the homolog of one of the critical cells; F/ implanting at least one charge cell at the output of each of the control cells, the total equivalent capacitance at the output of each control cell being equal to the total equivalent capacitance determined at C/ for the corresponding critical cell; G/ for each control cell, positioning each of the inputs of the control cell to a logic level in accordance with the configuration determined at D/ for the corresponding critical cell; H/implanting a signal generator connected to the input of the control circuit; and I/implanting a signal detector/receiver connected to the output of the control circuit.

In practice, each control cell may be connected at its output to a single charge cell having an equivalent capacitance equal to the sum of the equivalent capacitances determined at step C/ of said corresponding critical cell.

In other words, each output of all or part of the control cells may be connected to a charge cell having an equivalent capacitance substantially equal to the sum of the equivalent capacitances determined at step C/ for the corresponding critical cell.

Preferably, the output of the control cell which is directly connected to the output of the control circuit has no charge cell defined at step F/.

Advantageously, the method may further comprise implanting a multiplexer-inverter, one of the inputs of this multiplexer-inverter being connected to the signal generator, and the output of this multiplexer-inverter is connected to the input of the control circuit.

Advantageously, the method may further comprise implanting a return circuit formed of a third assembly of logic cells, this third assembly being the exact copy of the second assembly in terms of number and of type of logic cells, of connection diagram, and of equivalent capacitance at the output of each logic cell, the input of the third assembly being connected to the output of the second assembly and the output of the third assembly being connected to the other input of the multiplexer-inverter.

Preferably, the method may further comprise positioning each of the free inputs of the return circuit cells to a logic level capable of forcing a signal applied to the input of the return circuit to follow the considered path.

The logic levels applied to the cells of the return circuit may further altogether be capable of generating a signal at the return circuit output having a logic level identical to that of the signal applied to the input of the control circuit.

According to another aspect, a use of the circuit obtained according to the above-described method comprises applying a logic level to each of the free inputs of the return circuit cells, the applied logic levels being altogether capable of forcing a signal applied to the input of the return circuit to follow the considered path, and of generating a signal at the output of the return circuit having a logic level identical to that of the signal applied at the input of the control circuit.

For example, during a first cycle, the multiplexer-inverter selects the signal present at the input which is connected to the signal generator; and during a second cycle, the multiplexer-inverter selects the signal present at the input which is connected to the output of the return circuit.

Preferably, the second cycle is successively repeated.

BRIEF DESCRIPTION OF THE DRAWINGS

The foregoing and other features and advantages of the present invention will now be discussed in the following non-limiting description of a specific embodiment, in relation with the accompanying drawings.

DETAILED DESCRIPTION OF THE DRAWINGS

Figure 1:
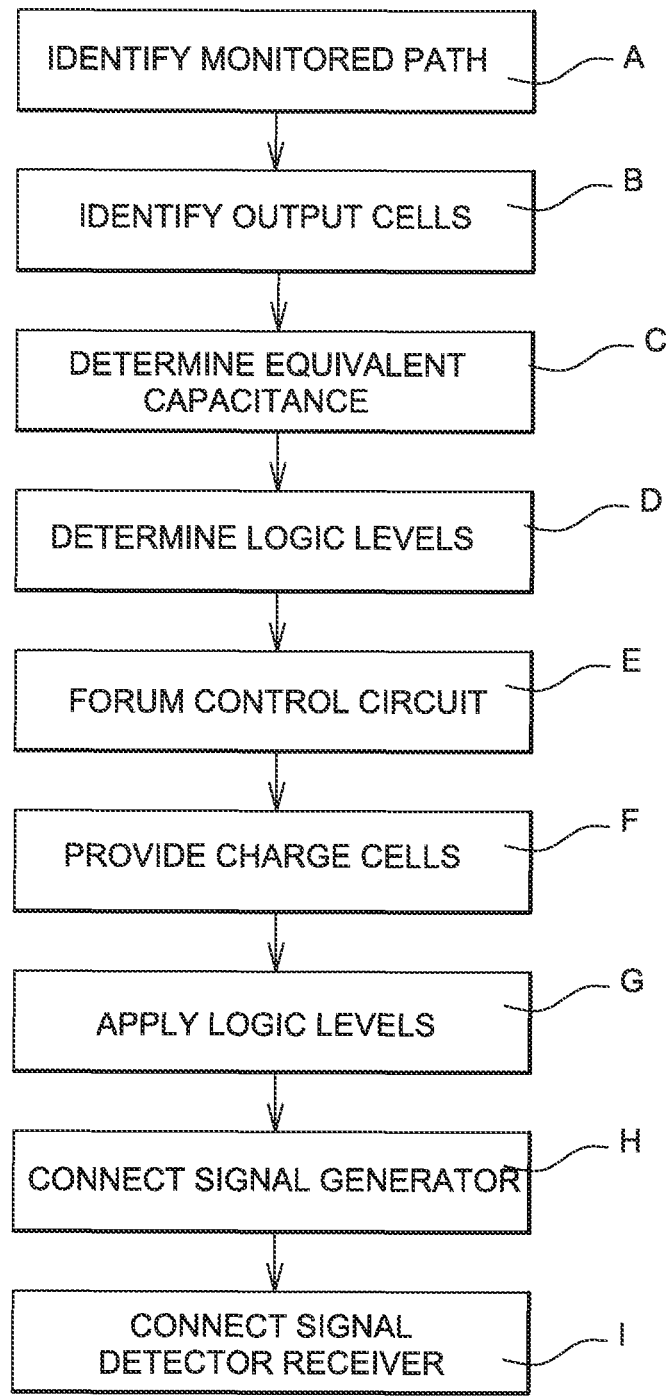
FIG. 1 shows the main steps of the design method according to an embodiment.

FIG. 1 shows the main steps, according to an embodiment, of a method for designing an electric circuit comprising at least one control circuit forming a replica of a portion of a main circuit according to a path to be monitored. The main circuit especially comprises multiple logic cells, such as logic gates, interconnected to perform one or several functions.

A first step (step A) comprises identifying one or several path(s) to be monitored of the main circuit. A path to be monitored may for example be the path having the slowest propagation time, or the most current-consuming path, or the path which requires a particularly high voltage, or which is sensitive to a temperature variation or an abrupt variation of the voltage, or any other parameter considered as critical. For example, a critical path may be the configuration (in terms of logic cell sequence) which limits the operation of the main circuit in the worst temperature and voltage conditions.

Figure 2:
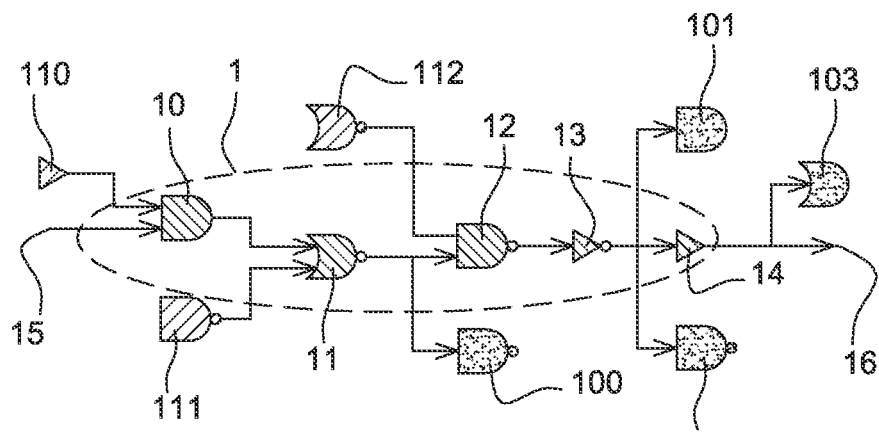
FIG. 2 is a simplified representation of a portion of a main circuit having some logic cells interconnected in a path to be monitored.

For example, FIG. 2 shows a reference circuit considered as including a critical path. This circuit is a portion of the main circuit and comprises a first assembly 1 of critical logic cells 10, 11, 12, 13, 14 crossed by the previously-identified path to be monitored. In practice, critical cells 10, 11, 12, 13, 14 are series-connected according to the path "to be monitored" between an input node 15 and an output node 16 of the main circuit. In other words, the critical path connects input node 15 to output node 16 by crossing each cell of first assembly 1 once only.

The next step (step B) comprises identifying all logic output cells 100, 101, 102, 103, other than those crossed by the path to be monitored, which are directly connected to the output of each of critical cells 10, 11, 12, 13, 14 of first assembly 1. The equivalent input capacitance of each of output cells 100, 101, 102, 103 is then determined (step C).

Then, for each critical cell 10, 11, 12, 13, 14 of the path to be monitored, a logic level to be applied to each of the free inputs of the considered critical cell, capable of forcing a signal present at the input node to follow the path to be monitored, is determined (step D). A free input of a critical cell is especially formed by an input which is not connected to another critical cell of the path to be monitored or which is not connected to the input node. In other words, the logic levels to be applied to critical cells 10, 11, 12, 13, 14 of first assembly 1 are such that critical cells 10, 11, 12, 13, 14 are made conductive and are such that the signal applied to input node 15 crosses critical cells 10, 11, 12, 13, 14 according to the path to be monitored.

Figure 3:
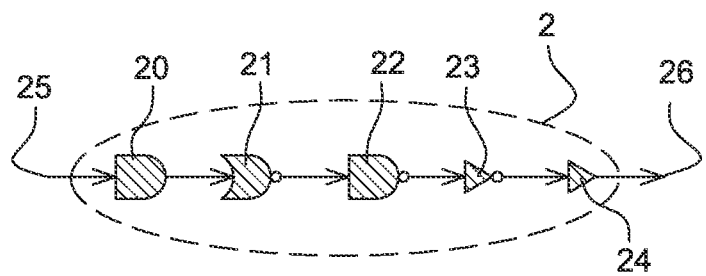
FIGS. 3 to 7 are simplified representations of the different steps of FIG. 1 to obtain the control circuit according to an embodiment.

A control circuit is then formed. To achieve this, as illustrated in FIG. 3, one first forms (step E) a second assembly 2 of control logic cells 20, 21, 22, 23, 24 between an input terminal 25 and an output terminal 26 of the control circuit.

Second assembly 2 is different from first assembly 1 and is the exact copy of first assembly 1 in terms of number and of type of logic cells, and in terms of connection diagram. Thus, each control cell 20, 21, 22, 23, 24 of second assembly 2 is the homolog of one of critical cells 10, 11, 12, 13, 14 of first assembly 1.

Figure 4:
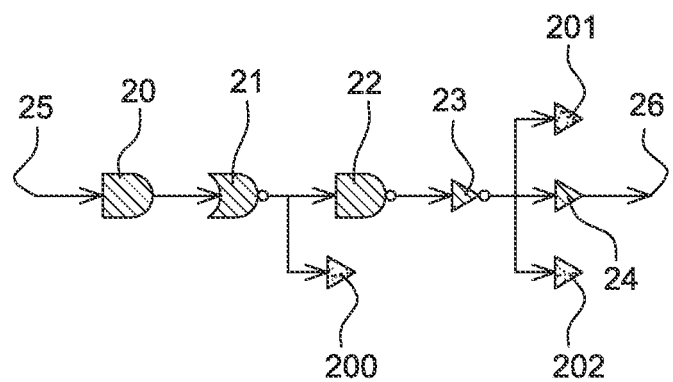
Figure 5:
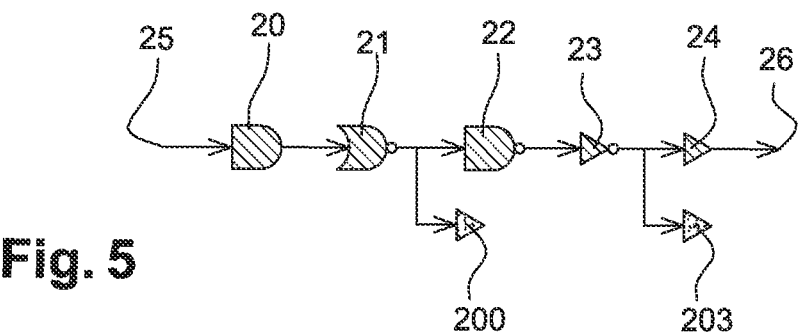

One then implants (step F) at least one charge cell 200, 201, 202, 203 at the output of each of the control cells 20, 21, 22, 23, 24. The total equivalent capacitance at the output of a control cell 20, 21, 22, 23, 24 should preferably be equal to the total equivalent capacitance determined at step C for the corresponding critical cell 10, 11, 12, 13, 14. In practice, the total equivalent capacitance at the output of a control cell 20, 21, 22, 23, 24 may be obtained from a single or several charge cell(s). For example, the total equivalent capacitance at the output of control cell 23 may be obtained with two charge cells respectively bearing reference numerals 201 and 202 as illustrated in FIG. 4, or be obtained with a single charge cell bearing reference numeral 203 as illustrated in FIG. 5. Each charge cell may in particular be a simple cell of inverter or follower type or merely a capacitance. Further, preferably, for control cell 24 directly connected to output terminal 26 of the control circuit, the total equivalent capacitance at the output of control cell 24 is preferably formed by the capacitance of a detector/receiver of signals 6 which will be directly connected to output terminal 26 of the control circuit.

At this stage, the control circuit is thus similar to the reference circuit, in terms of number of and of type of cells, in terms of connection diagram, and in terms of total equivalent load applied at the output of each cell.

Figure 6:
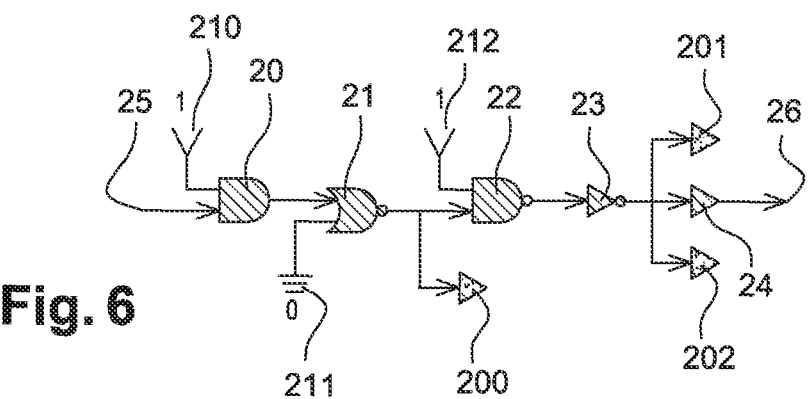

The free inputs of control cells 20, 21, 22, 23, 24 may then be positioned (step G) according to the configuration determined at step D for the corresponding critical cell 10, 11, 12, 13, 14. In other words, as illustrated in FIG. 6, for each control cell 20, 21, 22, 23, 24, each of its free inputs (that is, the inputs which are not connected to another control cell or to the input terminal of the control circuit) is positioned at a logic level in order to make control cell 20, 21, 22, 23, 24 conductive according to the path to be monitored. Thus, a signal applied to the input terminal of control circuit 20, 21, 22, 23, 24 will cross the control cells according to a path identical to the path to be monitored identified at step A. In the case where there would be several solutions for positioning the free inputs, especially in the case of a cell with several free inputs, the configuration which introduces the longest delay on the considered cell will for example be retained.

Figure 7:
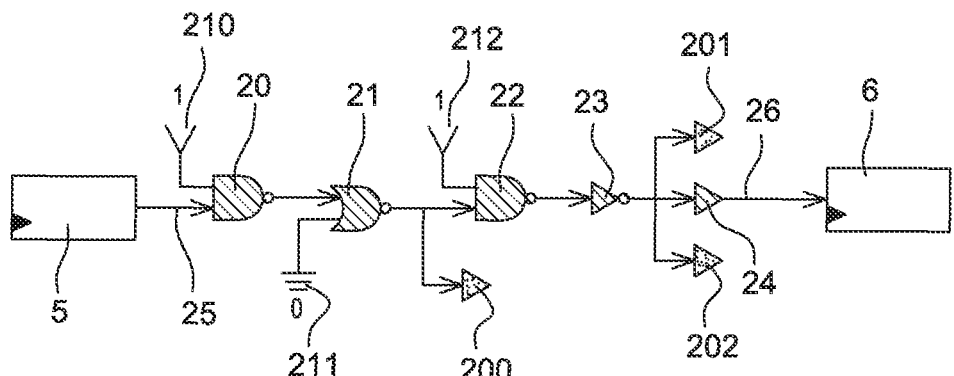

Finally, as illustrated in FIG. 7, a signal generator 5 is connected (step H) to input terminal 25 of the control circuit and a signal detector/receiver 6 is connected (step I) to input terminal 26 of the control circuit. As discussed hereabove, signal detector 6 may replace the charge cell to be placed at the output of control cell 23 which is connected to output terminal 26 of the control circuit.

The circuit thus obtained is a replica of the reference circuit along a path to be monitored. In practice, the control circuit may be arranged on the same chip as the main circuit. Thus, by operating the control circuit in the same conditions as the main circuit, it is possible to predict a possible failure of the main circuit. It is also possible to operate this control circuit independently from the main circuit, to study and anticipate the behavior of the main circuit in certain operating conditions.

In practice, the signal generator and the signal detector may be bistable components of D flip-flop type, controlled by a same clock signal having an adaptable period, or controlled by two different signals having a known and controllable delay between them. For example, in the case where the control circuit is the replica of the path having the slowest propagation time, it is possible to determine the maximum operating frequency of the main circuit. It is sufficient for this purpose to determine the delay between the application of a signal by the generator to the input terminal of the control circuit and the detection of an event on the output terminal of the detector.

According to another embodiment, it is possible to provide an operation in oscillation mode due to the addition of a return circuit. This additional circuit especially induces an additional delay in the path, and forms an additional load for the control circuit. The system thus formed is sub-optimized with respect to the reference circuit, and will fail before the reference circuit.

To achieve this, it is possible to provide implanting a multiplexer-inverter (FIG. 8) and implanting a return circuit formed of a third assembly of logic cells (FIG. 9) separate from the first and second assemblies.

Figure 8:
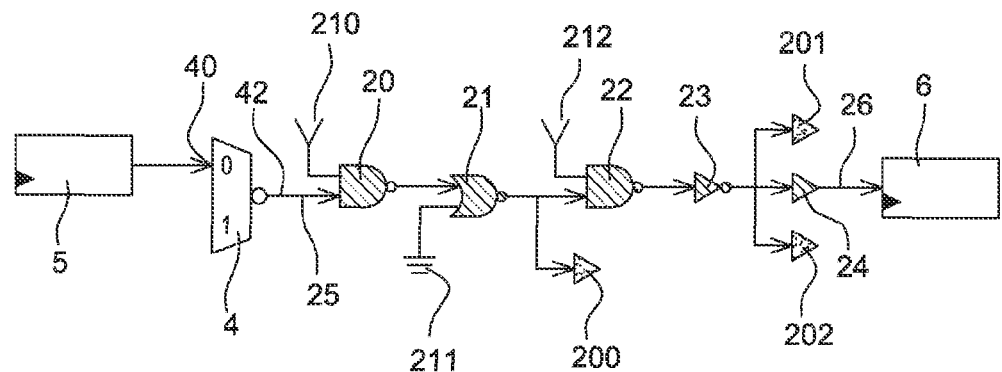
FIGS. 8 and 9 are simplified representations of the additional steps according to another embodiment which allows an oscillating operation.

For example, as illustrated in FIG. 8, one of inputs 40 of multiplexer-inverter 4 is connected to signal generator 5, and output 42 of multiplexer-inverter 4 is connected to input terminal 25 of second assembly 2 of the control circuit.

Figure 9:
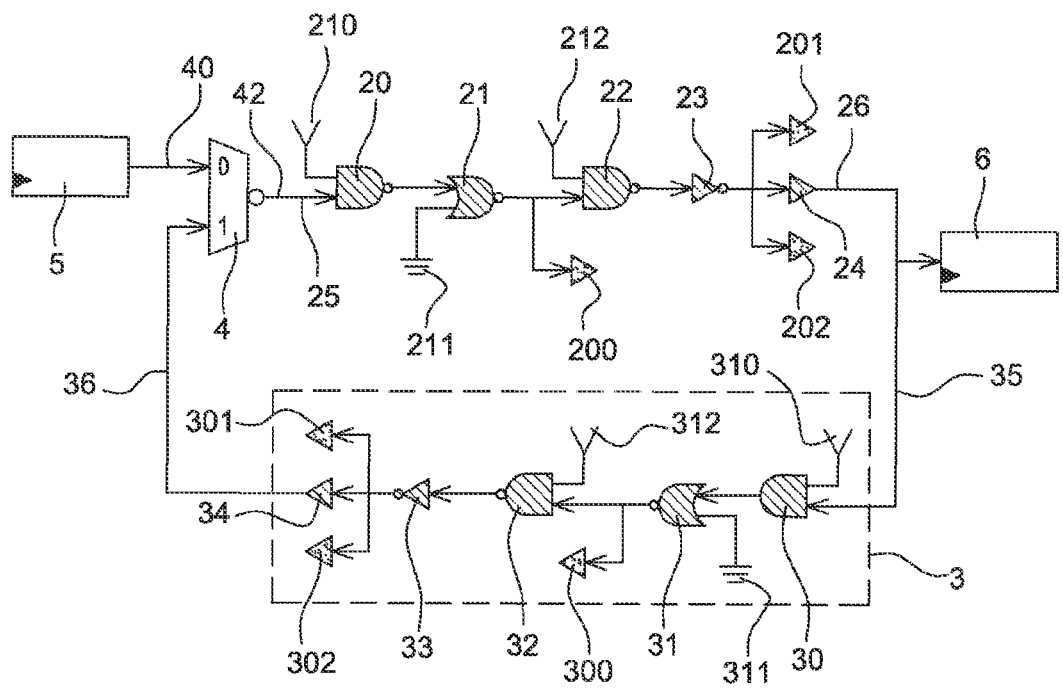

As illustrated in FIG. 9, the return circuit comprises a third assembly 3 of logic cells 30, 31, 32, 33, 34, and is an exact copy of second assembly 2 in terms of number and of type of logic cells, of connection diagram, and of equivalent capacitance at the output of each logic cell. This assembly 3 thus also is a replica of the path to be monitored. Input 35 of third assembly 3 is connected to output terminal 26 of second assembly 2 and output 36 of third assembly 3 is connected to the other input 41 of multiplexer-inverter 4. Like for the control circuit, in third assembly 3, the total equivalent capacitance at the output of last logic cell 34 following the path to be monitored is formed by multiplexer-inverter 4.

Figure 10:
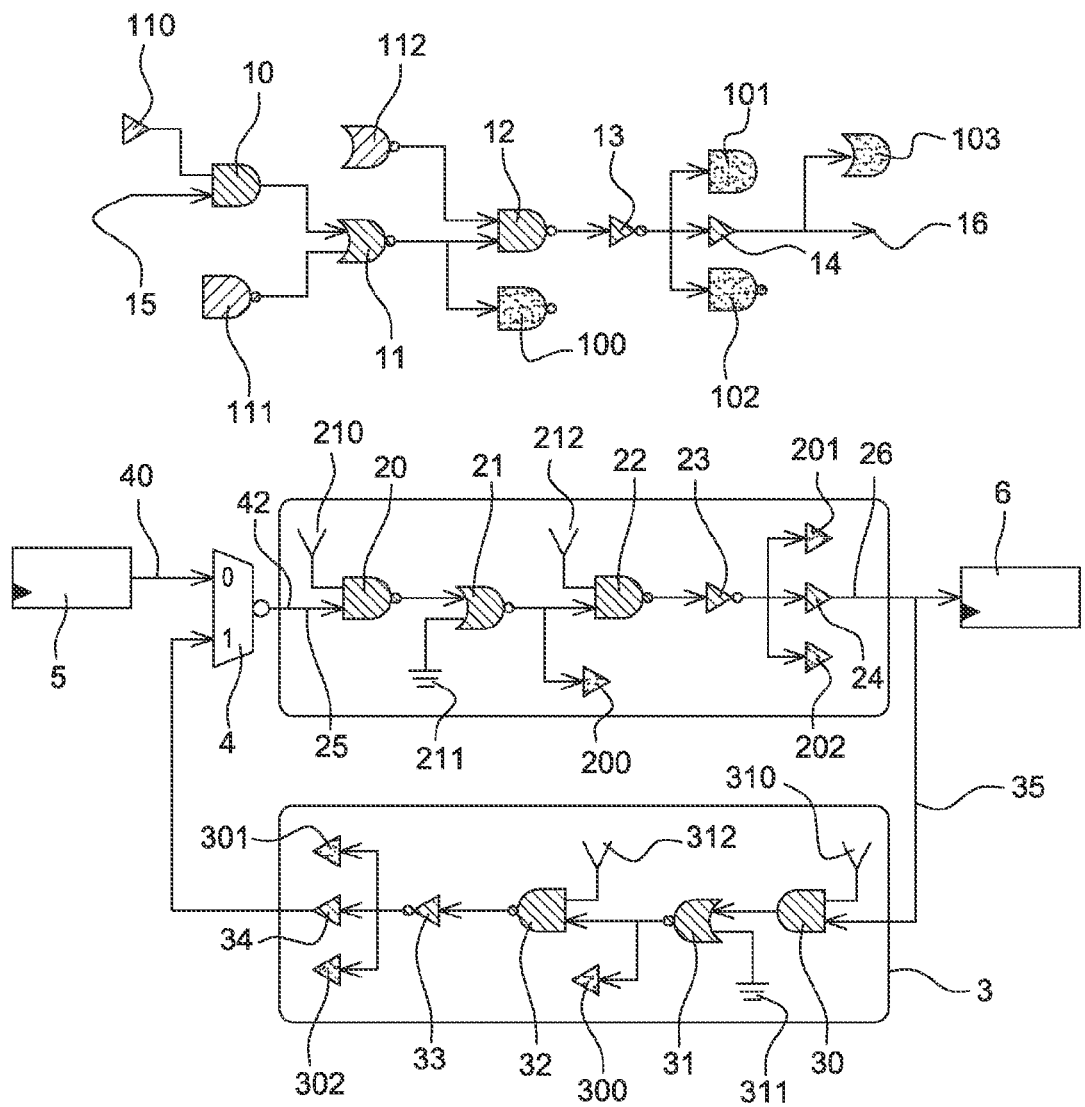
FIG. 10 is a simplified representation of the portion of the main circuit shown in FIG. 2, and a simplified representation of a circuit formed with the design method according to the other embodiment.

The system thus obtained is formed of two similar circuits assembled head-to-tail. Of course, the circuit thus formed may be arranged on the same chip as the main circuit. FIG. 10 shows the circuit thus obtained and the replicated portion of the main circuit side by side. In practice, the logic levels of the free inputs (that is, the inputs which are not connected to another logic cell or to the input of the return circuit) of cells 30, 31, 32, 33, 34 of third assembly 3 are then positioned to make logic cells 30, 31, 32, 33, 34 conductive. In other words, the logic levels are such that a signal applied to the input of the return circuit crosses all logic cells 30, 31, 32, 33, 34 of this return circuit. Further, the applied logic levels are such as for a signal applied to input terminal 25 of control circuit, the logic level of the resulting signal at output 36 of the return circuit is identical to that of the signal which has been applied to input terminal 25.

In other words, during a cycle during which the signal crosses the cells of the control circuit and the cells of the return circuit once, the output signal of the return circuit is identical to the signal applied to the input terminal of the control circuit.

Thus, by operating the system over several successive cycles, that is, in oscillation mode, it is possible to determine the operating frequency of the main circuit with a better accuracy.

Further, this oscillation may also enable to "age up" the silicon of logic components. Indeed, if the logic portion comprising the critical paths is much used, it will see the quality of its silicon vary along time and with the number of switchings of its transistors. An object of the oscillation thus is to catch up with this delay by using this mode possibly as often as the critical paths are used.

In practice, in oscillating mode, it is sufficient to select the input of the multiplexer connected to the signal generator for the first cycle, then to select the input of the multiplexer which is connected to the output of the return circuit for the next cycles.

The design method discussed hereabove is simple to implement since it is first sufficient to identify the logic cells of a path to be monitored and the logic levels to be applied at the input of these logic cells to make them conductive according to the path to be monitored, and to determine the equivalent capacitances at the output of each of the cells. It is then sufficient to copy the identified configuration, in the form of a circuit separate and electrically independent from the main circuit The circuit thus designed has an operation similar to that of a portion of a main circuit along a specific path. No modification of the structure of the main circuit is necessary. The obtained replica is independent from the main circuit in terms of structure and of operation. It is thus possible to know the limits and to accurately assess the performance of the main circuit. For example, it is possible to perform a real time control of the behavior of the main circuit operating in critical or limiting conditions.

What is claimed is:

1. A method, comprising:
    identifying a first assembly of critical logic cells that are series-connected according to a path to be monitored between an input node and an output node;
    identifying output logic cells which are not in the first assembly but are directly connected to an output of a critical logic cell in the first assembly;
    determining an equivalent capacitance of said output logic cells connected at the outputs of the critical logic cells for said path;
    for each critical logic cell, determining a logic level for each input which is not connected to another critical logic cell of said path that will force a signal present at the input node to follow said path;
    arranging the first assembly on an integrated circuit chip;
    arranging on said integrated circuit chip a control circuit formed of a second assembly of control logic cells that is an exact copy of the first assembly in terms of number and type of cells and in terms of connection diagram, wherein each of the control logic cells is a homolog of a corresponding one of the critical logic cells; and connecting at least one charge cell at the output of each of the control logic cells so that a total equivalent capacitance at the output of said each control logic cell is equal to the determined total equivalent capacitance for the corresponding critical logic cell.

2. The method of claim 1, further comprising:

for each control logic cell, asserting each of the inputs of said control logic cell to a logic level in accordance with the determined logic level for the corresponding critical logic cell.

3. The method of claim 2, further comprising:

coupling a signal generator to the input of the control circuit; and coupling a signal detector circuit to the output of the control circuit.

4. The method of claim 1, further comprising connecting one logic cell at its output to a single charge cell having an equivalent capacitance equal to a sum of the determined equivalent capacitances of said output cells.

5. The method of claim 1, wherein the output of the control logic cell directly connected to the output of the control circuit is not one of the provided charge cells.

6. The method of claim 5, further comprising providing a multiplexer-inverter having an input connected to a signal generator and having an output connected to the input of the control circuit.

7. The method of claim 6, further comprising providing a return circuit formed of a third assembly that is an exact copy of the second assembly in terms of number and of type of logic cells, of connection diagram, and of equivalent capacitance at the output of each logic cell, an input of the third assembly connected to the output of the second assembly and an output of the third assembly connected to another input of the multiplexer-inverter.

8. The method of claim 7, further comprising asserting free inputs of the logic cells of the return circuit to a logic level for forcing a signal applied to the input of the return circuit to follow said path.

9. The method of claim 8, wherein said logic levels applied to the logic cells of the return circuit further generates a signal at the output of the return circuit having a logic level identical to that of a signal applied at the input of the control circuit.

10. The method of claim 7, further comprising:

applying a logic level to each free input of the logic cells of the return circuit to force a signal applied at the input of the return circuit to follow said path, and generating a signal at the output of the return circuit having a logic level identical to that of the signal applied at the input of the control circuit.

11. The method of claim 10, wherein:

during a first cycle, the multiplexer-inverter selects the signal present at the input which is connected to the signal generator;

during a second cycle, the multiplexer-inverter selects the signal present at the another input which is connected to the output of the return circuit.

12. The method of claim 11, wherein the second cycle is successively repeated.

13. A method for replicating a critical path formed of a first assembly of critical logic cells that are series-connected between an input node and an output node, comprising:

determining an equivalent capacitance of output logic cells connected at the outputs of critical logic cells for said critical path;

determining a logic level for each input of the critical logic cells which is not connected to another critical logic cell of said critical path, said determined logic levels forcing a signal present at the input node to follow said path;

arranging the first assembly on an integrated circuit chip;

arranging on said integrated circuit chip a second assembly of control logic cells that copies the first assembly in terms of number of logic cells, type of logic cells and connection of logic cells such that each control logic cell is a homolog of a corresponding critical logic cell; and connecting charge cells at the output the control logic cells having a total equivalent capacitance equal to the determined equivalent capacitance for the output logic cells.

14. The method of claim 13, further comprising: asserting inputs of said control logic cells to logic levels in accordance with the determined logic levels of the corresponding critical logic cells.

15. The method of claim 13, further comprising multiplexing a return signal and input signal to an input of the second assembly of control logic cells.

16. The method of claim 15, further comprising providing a third assembly of control logic cells that copies the second assembly, said third assembly having an input coupled to an output of the second assembly and having an output generating said return signal.

17. The method of claim 15, wherein multiplexing comprises:

selecting, during a first cycle, the input signal for connection to the input of the second assembly of control logic cells; and selecting, during a second cycle, the return signal for connection to the input of the second assembly of control logic cells.

18. An integrated circuit chip, comprising:

a critical path formed of a first assembly of critical logic cells that are series-connected between an input node and an output node;

output logic cells connected to outputs of the critical logic cells; and a replica circuit, comprising:

a second assembly of control logic cells that copies the first assembly in terms of number of logic cells, type of logic cells and connection of logic cells such that each control logic cell is a homolog of a corresponding critical logic cell;

charge cells coupled at the output the control logic cells;

wherein said charge cells have a total equivalent capacitance equal to a total equivalent capacitance of said output logic cells; and a logic level circuit connection to each input of the control logic cells which is not connected to another control logic cell of said second assembly, said logic level circuit connections configured to permit a signal present at an input of the second assembly to propagate to an output of the second assembly.

19. The chip of claim 18, further comprising: a multiplexer circuit having an output connected to the input of the second assembly, a first input configured to receive an input signal and a second input configured to receive a return signal, said multiplexer configured to select one of the input signal and return signal for application to said input of the second assembly.

20. The chip of claim 19, further comprising: a third assembly of control logic cells that copies the second assembly, said third assembly having an input coupled to the output of the second assembly and having an output generating said return signal for application to the second input of the multiplexer circuit.

* * * * *